Figure 1:
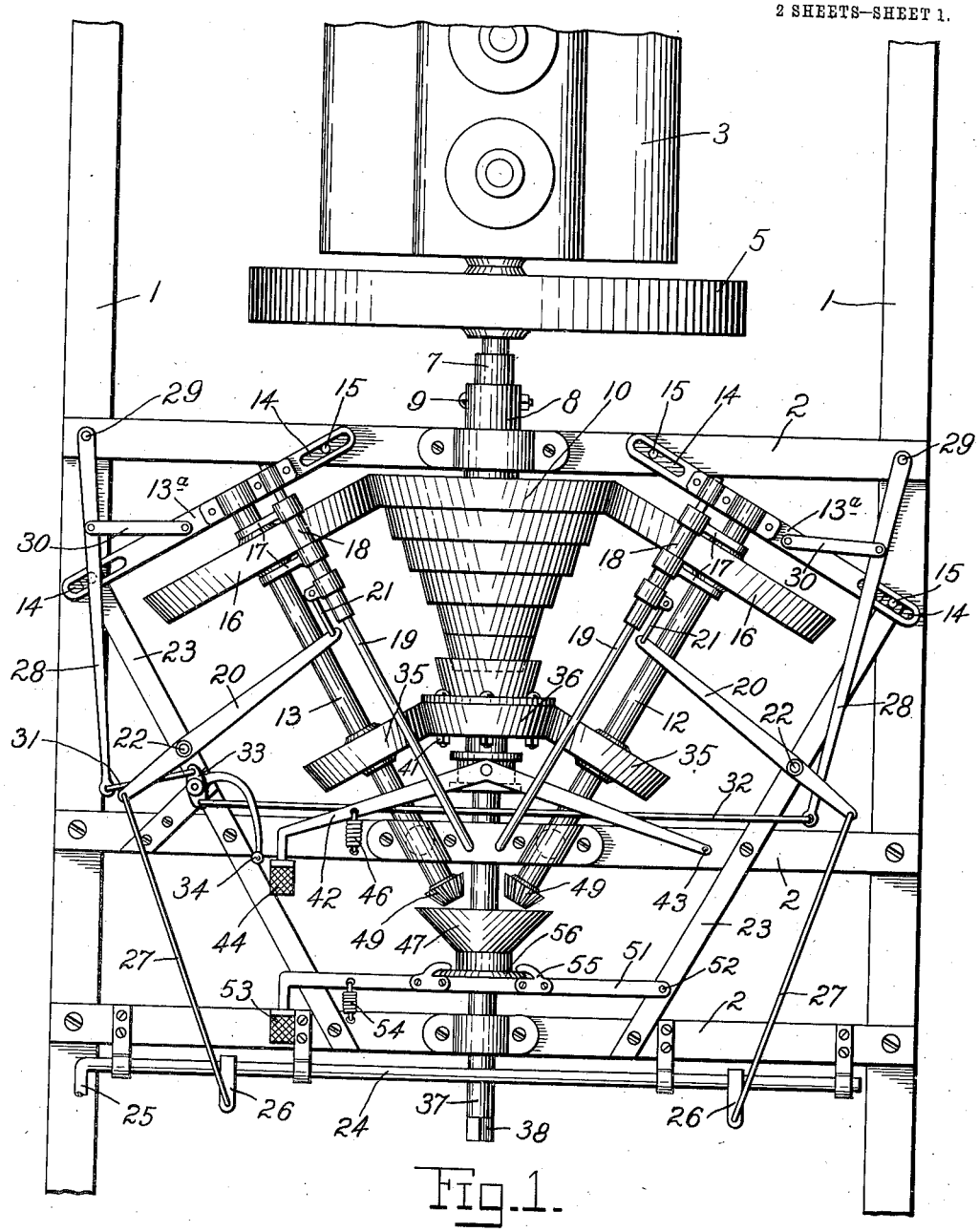

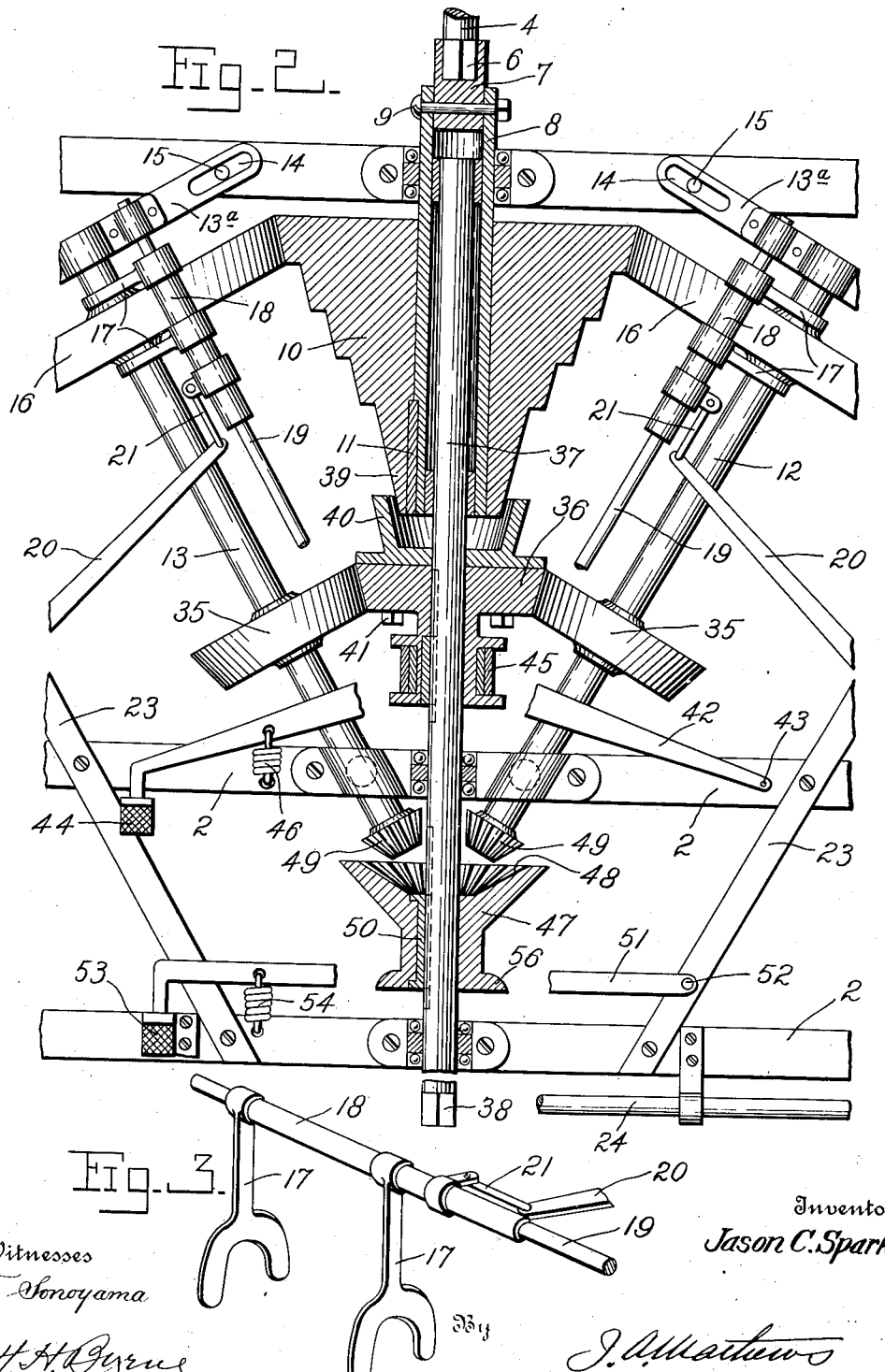

UNITED STATES PATENT OFFICE.

JASON C. SPARKS, OF CONCORD, NEBRASKA.

TRANSMISSION-GEARING.

1,050,704.

Specification of Letters Patent. Patented Jan. 14, 1913.

Application filed July 23, 1912. Serial No. 711,123.

*To all whom it may concern:*

Be it known that I, JASON C. SPARKS, a citizen of the United States, residing at Concord, in the county of Dixon and State of Nebraska, have invented certain new and useful Improvements in Transmission-Gearing, of which the following is a specification.

The present invention relates to transmission gearing for motor vehicles, and consists in the combinations and arrangements of parts hereinafter disclosed and particularly pointed out in the accompanying claims.

The invention is shown, by way of illustration, in the annexed drawings wherein, Figure 1 is a top plan view of the gearing showing its manner of application to a motor driven vehicle; Fig. 2 is a similar view, with parts omitted and in section for the sake of clearness; and Fig. 3 is a detail perspective view of one of the friction wheel shifting devices.

Referring to the construction in detail, 1 designates the chassis of a motor car having cross pieces 2 on which are mounted the several parts of the gearing; and 3 indicates the motor whose shaft 4 has mounted thereon the usual flywheel 5. The end 6 of the shaft 4 is squared to receive a head 7 that is secured on a sleeve 8 through the medium of a bolt 9, and a stepped friction pulley 10 is fixed to said sleeve 8 through the medium of the key 11.

A pair of counter shafts 12 and 13 disposed at angles, relatively to the sleeve 8, are journaled on one of the cross members 2 at one end, and each on an independent bar 13$^a$ at the opposite end. Each of said bars 13$^a$ is mounted to slide on the chassis sections 1 and 2 through the medium of slots 14 formed therein at either end, and pins 15 determine the extent of movement of said bars 13$^a$. On each of the shafts 12 and 13 is slidably mounted a friction wheel 16 adapted to have frictional engagement with either of the stepped surfaces on the cone pulley 10, and the means for shifting each of said friction wheels 16 consists of a pair of forked arms 17 mounted on a sleeve 18 that is slidably mounted on a shaft or rod 19, which rod is, in turn, mounted on the cross bar 13$^a$ and one of the frame cross members 2. A lever 20 is secured to the sleeve 18 through the medium of a link 21, and said lever is pivoted at 22 to the bar 23 that is supported on the frame. The two levers for the two friction wheels 16 are adapted to be actuated from a common means consisting of a shaft 24 having a portion 25 to which is secured a lever or treadle. Arms 26 fixed to said shaft 24 connect to the lever 20 through the medium of rods 27. Through this arrangement it will be readily seen that the two friction wheels 16 may be moved simultaneously to engage with the selected speed required of the cone pulley 10.

The friction wheels 16 will require to be moved in a lateral direction for engaging with the different steps on the cone pulley, and to that end the shaft supporting bars 13$^a$ are slidably mounted, as above stated. The means for manually shifting each of said sliding bars consists of a lever 28, pivotally mounted at 29, and having a link connection 30 with said slidable bar 13$^a$. The two levers 28 are connected by rods 31 and 32 with a plate 33 that is pivotally mounted and is provided with an arm 34 through which the same may be turned for moving said rods 31 and 32 inwardly or outwardly, as required. When the friction wheels 16 have been moved clear of the engaging step of the cone pulley 10, said wheels 16 may then be shifted to the desired position and then again thrown inwardly against the selected step of said cone pulley.

On each of the shafts 12 and 13 is mounted a friction wheel 35 of truncated conical design, and both of said friction wheels 35 are in mesh with a friction wheel 36 that is splined on the shaft 37, whose end 38 is constructed to engage with the driving element connecting with the rear wheels of the vehicle. The opposite end of the shaft 37 fits within and is journaled on the sleeve 8. Through the medium of the several gear elements (10, 16, 35 and 36) the shaft 37 is driven to impart selective speeds for the forward drive of the vehicle.

The stepped cone gear 10 has one section 39 thereof adapted to have frictional engagement with a cupped member 40 that is secured by bolts or other means 41 to the friction wheel 36; and when said elements 39 and 40 are thrown into engagement the shaft 37 is driven by a direct drive from the cone gear 10. The means for shifting the shaft 37 to bring said elements 39 and 40 into engagement consists of a lever 42 pivoted at 43 to the frame 2, and is provided at its free end with a treadle 44 which engages with a collar 45 on the shaft 37. A spring 46 secured to the frame 2 and lever 42 respectively acts to hold the shaft 37 in that position illustrated in Fig. 2.

The reverse drive of the shaft 37 is effected through the medium of a cone gear 47 having a toothed recess 48 adapted to be brought into engagement with the pair of cone gear wheels 49 secured to the ends of the shafts 12 and 13. Said cone gear 47 is, through a key 50, splined on the shaft 37, and is adapted to be moved thereon through the medium of a lever 51 pivoted to the frame at 52 and provided with an actuating treadle 53. A spring 54 connected to said frame and lever 51 respectively normally holds the gear element 47 in that position shown in Figs. 1 and 2. Said lever 51 is provided with claws 55 that engage with a collar 56 formed integral with the cone gear 47.

It is obvious that those skilled in the art may vary the details of construction and arrangement of parts, without departing from the spirit of my invention, and therefore I do not wish to be limited to such features except as may be required by the claims.

Having thus described my invention, what I claim as new is:

1. In a transmission gearing the combination of a support; a driving shaft; a sleeve connected to said shaft; a cone friction gear keyed on said sleeve; a pair of relatively angularly disposed counter shafts; a friction gear slidably mounted on each of said angularly disposed counter shafts and adapted to engage with said cone friction gear; means for sliding said gears; a friction gear fixedly mounted on each of said angularly disposed counter shafts; a driven shaft; a friction gear splined on said driven shaft and adapted to engage with the friction gears fixed on said counter shafts; and means for shifting said angularly disposed counter shafts whereby to allow the slidable friction gears to be moved to engage with the cone friction gear for selective speeds, substantially as described.

2. In a transmission gearing the combination of a support; a driving shaft; a sleeve connected to said shaft; a stepped friction gear keyed on said sleeve; a pair of relatively angularly disposed counter shafts swingingly mounted on said support; a friction gear slidably mounted on each of said counter shafts; means for sliding said gears on said counter shafts; a friction gear fixedly mounted on each of said angularly disposed counter shafts; a driven shaft; a friction gear splined on said driven shaft and adapted to engage with the friction gears fixed on said counter shafts; means for swinging said counter shafts whereby to allow the slidable friction gears to be moved to engage with the stepped friction gear to effect forward drive of the driven shaft at selective speeds; cone pinions mounted on said counter shafts; a cone pinion splined on said driven shaft and adapted to mesh with said counter shaft cone pinions for effecting reverse drive of said driven shaft; and means for moving said splined cone pinion into and out of engagement with said counter shaft cone pinions, substantially as described.

3. In a transmission gearing the combination of a support; a driving shaft; a sleeve connected to said shaft; a cone friction gear keyed on said sleeve; a pair of relatively angularly disposed counter shafts; a friction gear slidably mounted on each of said angularly disposed counter shafts and adapted to engage with said cone friction gear; means for sliding said gears; a friction gear fixedly mounted on each of said angularly disposed counter shafts; a driven shaft; a friction gear splined on said driven shaft and adapted to engage with the friction gears fixed on said counter shafts; a cupped friction gear secured to said splined friction gear and adapted to engage with the end of said cone gear for effecting direct drive of said driven shaft by the driving shaft; means for moving said cupped friction gear into and out of engagement with said cone gear; and means for shifting said counter shafts whereby to allow the slidable friction gears to be moved to engage with the cone friction gear for effecting selective speeds for said driven shaft, substantially as described.

4. In a transmission gearing the combination of a support; a driving shaft; a sleeve connected to said shaft; a stepped friction gear keyed on said sleeve; a pair of relatively angularly disposed counter shafts swingingly mounted on said support; a friction gear slidably mounted on each of said counter shafts; means for sliding said gears on said counter shafts; a friction gear fixedly mounted on each of said angularly disposed counter shafts; a driven shaft; a friction gear splined on said driven shaft and adapted to engage with the friction gears fixed on said counter shafts; means for swinging said counter shafts whereby to allow the slidable friction gears to be moved to engage with the stepped friction gear to effect forward drive of the driven shaft at selective speeds; cone pinions mounted on said counter shafts; a cone pinion splined on said driven shaft and adapted to mesh with said counter shaft cone pinions for effecting reverse drive of said driven shaft; means for moving said splined cone pinion into and out of engagement with said counter shaft cone pinions; a cupped friction gear secured to said splined friction gear and adapted to engage with the end of said stepped friction gear for effecting direct drive of said driven shaft by the driving shaft; and means for moving said cupped friction gear into and out of engagement with said stepped cone gear, substantially as described.

5. In a transmission gearing the combination of a supporting frame; a driving shaft; a sleeve connected to said shaft; a stepped friction gear keyed on said sleeve; a counter shaft swingingly mounted on said frame at either side of said sleeve; a driven shaft journaled on said frame and fitting within and journaled on said sleeve; a friction gear slidably mounted on each of said counter shafts and adapted to engage with said stepped gear; forked arms engaging with each of said slidable gears; lever and rod mechanism for moving said forked arms to slide said gears on said counter shafts; lever and rod mechanism for swinging said counter shafts for permitting said slidable gears to be moved; a friction gear secured to each of said counter shafts; a friction gear splined on said driven shaft and adapted to engage with said friction gears secured on said counter shafts; a cupped friction gear secured to said splined gear and adapted to have frictional engagement with said stepped gear for imparting rotation direct to the driven shaft from the driving shaft; a lever mounted on the frame and connected to said splined friction gear whereby to move the cupped gear into engagement with the stepped gear; a spring secured to said lever for holding said splined gear in engagement with its respective gears; a cone pinion secured to each of the counter shafts; a cone pinion splined on said driven shaft and adapted to engage with said counter shaft cone pinions for effecting reverse drive of said driven shaft; and a means for moving said splined cone pinion into and out of engaging position, substantially as described.

In testimony whereof I affix my signature in presence of two witnesses.

JASON C. SPARKS.

Witnesses:
M. E. SPARKS,
E. F. SPARKS.